Aug. 8, 1933.    C. E. WILLIAMS    1,921,060
METHOD OF PURIFYING METALS
Filed March 23, 1931

INVENTOR.
Clyde E. Williams
BY
ATTORNEYS.

Patented Aug. 8, 1933

1,921,060

UNITED STATES PATENT OFFICE 1,921,060

METHOD OF PURIFYING METALS

Clyde E. Williams, Columbus, Ohio

Application March 23, 1931. Serial No. 524,583

9 Claims. (Cl. 75—17)

My invention relates to a method of purifying metals. It has to do particularly with the provision of a method for deoxidizing or degasifying either ferrous or non-ferrous metals or for both deoxidizing and degasifying such metals.

In the prior art of refining metals, the removal of oxygen or other harmful impurities in metals has been accomplished by the addition of solid reducing agents to liquid metal baths. For example, it has been more or less customary to add silicon, manganese, aluminum, etc., to iron or steel; or sometimes the "poling" of liquid copper in the refining furnace has been resorted to.

The possibility of the use of reducing gases or vapors for the purpose of removing oxygen, sulphur, or other harmful impurities has been realized by metallurgists but the practical use of such gases or vapors has been impossible in the past because no satisfactory method has been found to bring about suitable contact between such gases or vapors and liquid metals at high temperatures. Furthermore, such gases as have been used, became dissolved in the metal and produced harmful effects which offset any advantage that might be gained from the removal of oxygen, sulphur, etc. Thus, it has been well known that hydrogen gas would remove oxygen from copper, but when hydrogen at ordinary pressure is so used, the mechanical properties of the deoxidized metal are seriously injured.

One of the objects of this invention is to provide a simple and effective method for correcting this oxidized condition of the metal and for eliminating gases or other impurities therefrom. Another object of my invention is to provide a simple and effective method for eliminating gases or other impurities from the metal, whether this metal be oxidized or not.

One phase of my invention comprises the use of reducing gas or vapor simultaneously with the application of vacuum so as to prevent the contamination of deoxidized or otherwise purified metal by dissolved reducing gases or vapors. My invention further provides a practical method of producing such simultaneous and beneficial effects. It further involves the use of a gas, which may be either a reducing gas or an inert gas for lifting the metal, while at the same time, vacuum is applied for the removal of gases or vapors which are undesirable and contaminating.

My invention preferably contemplates the subjection of the metal to treatment by gases or vapors of metal or metalloids which pass upwardly therethrough and simultaneously bring about movement of the metal toward a receptacle which is designed for the reception of the metal in its deoxidized and degasified state. It preferably also contemplates the application of these gases or vapors in such a way that they act as an "air-lift" or "gas-lift" to raise the metal to an overflow point for conduction into a second receptacle. After this, the gases or vapors which have been utilized for lifting and simultaneously deoxidizing the metal, and the other gases contained in the metal, are preferably automatically removed by vacuum, while the purified metal passes into the second receptacle. Furthermore, my invention desirably contemplates the protection of the purified metal from subsequent oxidation by superimposing thereon a blanket of inert gas.

The preferred apparatus which I utilize in the performance of my invention is diagrammatically illustrated in the accompanying drawing wherein similar characters of reference designate corresponding parts and wherein.

Figure 1:
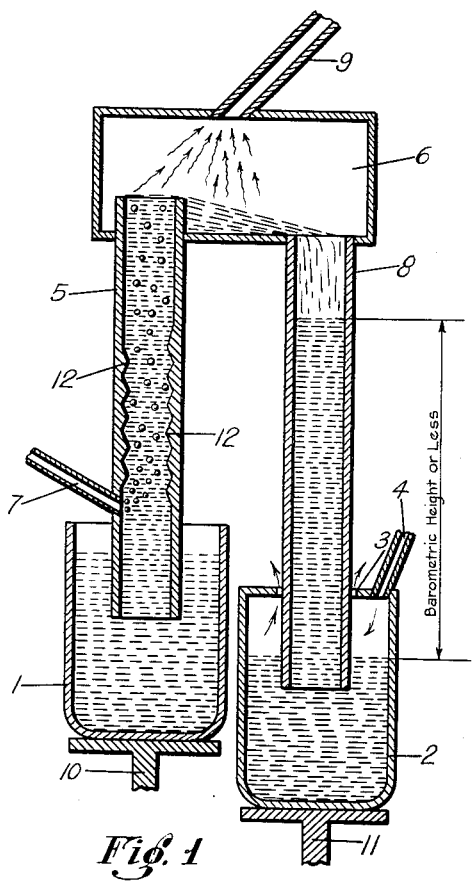
Figure 1 is a showing, in section, of the principal portions of my preferred apparatus.

In the drawing, the apparatus which I preferably utilize, as shown in Figure 1, comprises a ladle or other container adapted to receive liquid metal before purification and this container may be designated 1. In cooperative relation to this, I preferably provide another container 2. The container 1 is open at its top and the container 2 is partially closed at its top, being provided with a concentric opening 3 and with an inlet conduit 4 to one side of said opening 3.

The container 1 is designed to contain a substantial amount of crude liquid metal and projecting downwardly into said metal, to a substantial distance below the surface thereof is a tubular member 5 which is open at its lower end beneath the surface of this metal and which is also open at its upper end. The upper end of this tubular member 5 extends through the bottom of a chamber 6 to a substantial distance above the floor of this chamber. The tubular member 5 is also provided with an inlet pipe 7 for a purpose to be subsequently described.

Extending downwardly from the floor of the chamber 6 is a tubular member 8, whose upper end is substantially below the level of the upper end of the tubular member 5. The lower end of the tubular member 8 is open and is projected downwardly through the opening 3 in the top of the container 2 and extends downwardly to a substantial depth within this container 2. The opening 3 is of slightly larger diameter than the tubular member 8, for a purpose to be described.

The container 6 may be of any desired form and is preferably air-tight. Extending upwardly from the interior thereof is an outlet pipe 9 which is preferably connected to vacuum.

The containers 1 and 2 are mounted upon supporting members 10 and 11. These supporting members are preferably independently adjustable.

In the operation of my method with apparatus of the type just described, the crude liquid metal is placed in the container 1. Container 2 preferably also contains an amount of previously purified metal sufficient to cover the bottom of the tubular container 8. Vacuum is then applied through the vacuum connection 9 causing a rise of the columns of metals in the tubular members 5 and 8 to a height corresponding to the difference in pressure of the outer atmosphere and that produced by the vacuum in container 6. When the columns 5 and 8 have become substantially filled with impure and purified metal, respectively, a reducing gas is introduced under pressure through the tubular member 7 and into the interior of the tubular member 5. This gas may be hydrogen, methane, carbon-monoxide, and other carbonaceous gases, hydrides, halogens or volatile halides, or vapors of strongly reducing, volatile, and relatively insoluble metals or metalloids, such as sodium, zinc, and phosphorus, etc. These gases pass upwardly through the tubular member 5 and act upon the well-known principle of the "air-lift". In other words, they produce a "gas lift" which causes a column of metal to rise in the tubular member 5 and to ultimately overflow the top thereof. (This action is accentuated by the vacuum created through the medium of the tubular member 9 in the chamber 6.)

The gases which have been introduced into the tube 7, bubble upwardly through the metal in the tube 5 and, in the course of this operation, they become intimately mixed with the liquid metal. The tube 5 is preferably provided with internal projections 12 which ensure active mixing and turbulence and produce a more active flow of the metal.

The gases effectively cleanse and deoxidize the metal in this riser column and, at the same time, cause it to spill over at the upper end thereof from which it gravitates into the open end of the tube 8. These gases and all other gases are separated from the metal and are then carried away through the vacuum tube 9.

The metal which is delivered into the tube 8 passes downwardly into the container 2 and continuously maintains a barometric column in the container 2, the metal thus collected in the container 2 being cleansed, deoxidized and evacuated of all gases. The collected metal is preferably protected from contact with the air or other oxidizing influences by the introduction into the container 2 of a blanket of gas which is inert to metal being treated and which is relatively insoluble in the collected metal, as illustrated in Figure 1. Among the gases inert to the metal which I may use are: argon, helium, or others unable to enter into chemical association with the metal being treated.

Figure 2:
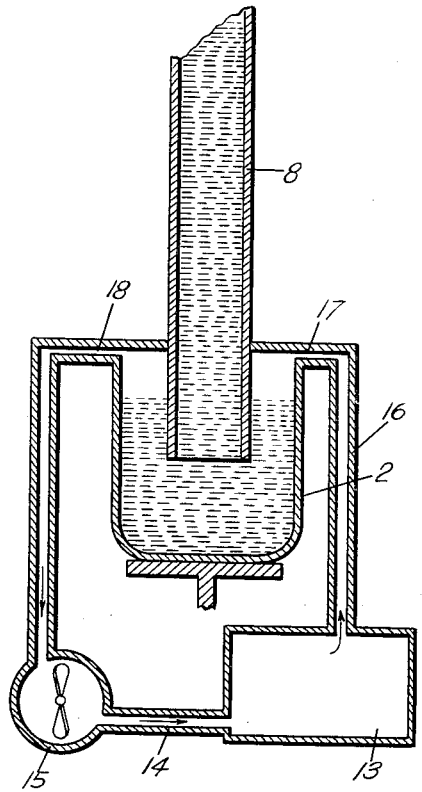
Figure 2 is a sectional view of a means which I may utilize for circulating inert gas over the purified metal.

If desired, the inert gas which is used as a blanket for the purified metal in order to prevent reoxidation thereof may be supplied to the container 2 by a circulating system which is diagrammatically illustrated in Figure 2. In this type of apparatus, an inert gas container is shown at 13. This gas container 13 has an inlet tube 14 whose outer end is connected to a fan structure 15. The tank 13 is further provided with an outlet pipe 16 which leads into the upper end of the container 2 as at 17. The container 2 is further provided with an outlet conduit 18 which leads back to the fan structure 15. In operation, the fan serves to force the gas from the gas tank, through the outlet pipe 16 and into the container 2 at 17. In this case, the tube 8 fits tightly within an opening in the upper end of the container 2 and the blanket of inert gas remains upon the top of the purified metal, except insofar as it is withdrawn continuously through the pipe 18 under the influence of the fan.

The barometric columns 5 and 8 may be heated by suitable means (not shown) to bring them to the melting point of the metal being treated. During the operation of the method, the heating may be discontinued and is ordinarily only used as a precaution to ensure that reducing conditions will exist in the rising metal in the column 5 and to prevent solidification of the metal at the beginning of the operation. The apparatus may be constructed of gas-tight steel shell, lined with suitable refractory material, or it may be constructed of other suitable materials, such as fused silica, et cetera. The vacuum line 9 is connected to any suitable pump capable of creating an adequate vacuum, that is, one capable of supporting the barometric height of the liquid metal.

Although it will ordinarily be advantageous to use full barometric vacuum in chamber 6, my invention does not limit itself to this column height, since it is obvious that by suitable adjustment of the vacuum in 6, it will be possible to utilize the principle set forth above in any apparatus having less column height than that corresponding to the barometric height for the liquid metal in question. Thus, by raising container 1, or by lowering the apparatus consisting of the two columns 5 and 8 and the evacuating chamber 6 further down into the baths of liquid metal in containers 1 and 2, it will be possible to increase the speed of travel of metal through the apparatus to the desired extent and to regulate the relative proportions in the time for the deoxidation and evacuation by further adjustment of the gas flow at 7 to suit any particular set of conditions required by the nature of the metal.

Figure 3:
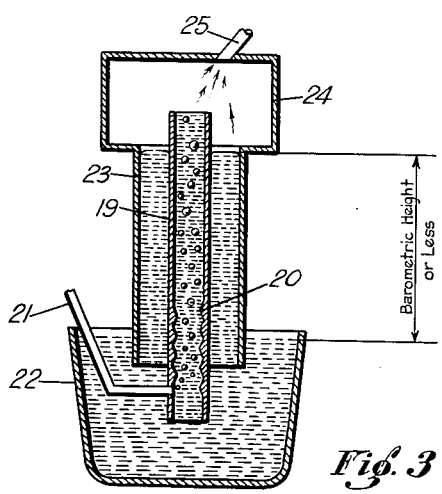
Figure 3 is a sectional view illustrating a modification of my method and apparatus.

In the modification shown in Figure 3, an apparatus is shown which permits the deoxidation or evacuation of the metal or both deoxidation and evacuation without transferring the metal to another container. In this case, the riser column is designated 19 and may likewise be provided with constrictions or projections, as at 20, which ensure active mixing and turbulence and prevent clogging of the column. The column is further provided with an inlet pipe 21 through which gas may be introduced under pressure.

In this structure, the riser column is open at its upper and lower ends and the lower end is immersed to a substantial extent within a container 22 which holds the metal to be treated. Furthermore, this riser column is disposed concentrically within a discharge column 23 of substantially greater diameter. The lower end of the discharge column 23 is open and is likewise immersed in the metal in the container 22, although not as deeply as the riser column 19. The upper end of the discharge column opens into a chamber 24 which has a vacuum tube 25 leading therefrom.

In operation of this modified structure, the gas under pressure is introduced through the tube 21 and bubbles upwardly through the riser column 19. If a reducing gas is used, the metal within the riser column is deoxidized thereby. Then, this deoxidizing gas and all other gases from the metal pass upwardly into the chamber 24 and then into the vacuum tube 25. At the same time, the metal within the riser column, being raised by the "gas-lift", spills over the top of the riser column and is delivered into the discharge column 23. It will be understood that this apparatus may be adjusted similarly to the apparatus illustrated in Figure 1 for the purposes indicated in the description of this Figure 1, and may also be provided with a blanket of inert gas for preventing further contamination of the metal, as indicated in Figure 2.

It will also be understood that in either of the types of apparatus illustrated, my method may be used for the purpose of both deoxidizing and evacuating the selected metal or it may be used merely for the sole purpose of evacuating the metal, that is, for the purpose of merely removing the gases therefrom. In the latter case, the gas which is introduced under pressure through either the tube 7 or the tube 21 is a gas which is inert to the metal being treated and relatively insoluble in this metal.

In certain cases where the metal to be treated contains considerable amounts of dissolved gases, it is possible to utilize the apparatus shown in Figure 1 for the simple degasification of metal utilizing a considerably decreased volume of gas to operate the rising metal column in 5 and even to completely omit the use of the gas through inlet 7 inasmuch as the evolution of dissolved gases from the impure metal will cause gas bubbles to form in column 5 and to produce the required circulation.

Furthermore, in certain cases, it will be desirable to supply a plurality of tubulatures for the practical operation of my invention. Thus, in order to increase the rate at which impure metal in a given container may be treated, I may preferably produce this effect by an apparatus containing a multiplicity of tubes operating in parallel flow. In other cases, it may be desirable to utilize several kinds of reducing gases or vapors on the same metal, and in this case, I preferably arrange a multiplicity of tubulatures in cascade system, each of which operates independently but in series flow, and I specifically include such combination within the scope of my invention.

It will thus be seen that I have provided an extremely simple method and apparatus for effectively purifying metals, whether these metals be ferrous metals or non-ferrous metals. Furthermore, it will be obvious that the heights of the barometric columns may be adjusted to any less column height to that corresponding to the barometric height for the liquid metal in question. In other words, the riser and discharge column may be lowered further down into the baths of liquid metal and this adjustment may be utilized to increase the speed of travel of the metal through the apparatus to any desired extent. This adjustment may be used to regulate the relative proportions in time for the deoxidation and evacuation or for evacuation alone and further adjustment of the gas flow through the tube 7 or the tube 21 may be made to suit any particular set of conditions required by the nature of the metal being treated.

It will be understood that, although I have used the term "tube" throughout the application, by this term I intend to cover any hollow member through which the metal may pass to various parts of the apparatus.

Having thus described my invention, what I claim is:

1. A method of purifying metals which comprises lifting a metal in a molten state upwardly through a tube by the introduction of substance in vapor phase under pressure into the metal in such tube, overflowing the metal from the upper end of said tube, and removing gases or vapors therefrom by vacuum.

2. A method of purifying metals which comprises lifting a metal in a molten state upwardly through a tube by the introduction of substance in vapor phase under pressure into the metal in such tube, overflowing the metal from the upper end of said tube, and delivering it into a container, and removing gases or vapors from the metal substantially at the point of overflow by the application of vacuum thereto.

3. A method of purifying metals which comprises lifting a metal in a molten state upwardly through a tube by the introduction of substance in vapor phase under pressure into the metal in such tube, overflowing the metal from the upper end of said tube, removing gases or vapors therefrom by vacuum, delivering the purified metal into a container and covering the purified metal with a blanket of gas inert to such metal.

4. A method of purifying metals which comprises creating a column of liquid metal in a tubular container by means of vacuum, forcing a reducing substance in vapor phase upwardly through said tubular container, to create overflow of the metal therefrom, removing gases or vapors from the said liquid metal by vacuum, and delivering the purified metal into a second column.

5. A method of purifying metals which comprises creating a column of liquid metal in a tubular container by means of vacuum, forcing a reducing substance in vapor phase upwardly through said tubular container, to create overflow of the metal therefrom, removing gases or vapors from the said liquid metal by vacuum, delivering the purified metal into a second column, and protecting the purified metal by gas inert to such purified metal.

6. The method of purifying metals which comprises disposing the metal to be purified in a molten state in a container, introducing substance in vapor phase into a tube communicating with said container to lift the metal upwardly and to effect overflow from said tube, passing the metal overflowing from said tube into a second tube having its upper end lower than said first-named tube, passing the metal through said second-named tube into a container for the purified metal, and evacuating the gases or vapors from said tubes.

7. A method of purifying metals which comprises moving a mass of molten metal progressively through and out of a confined space, introducing into such metal while flowing through said space a substance in vapor phase of such nature that it will combine with the elements present as impurities in the metal, discharging the purified metal from said space, and extracting by vacuum the gaseous compounds thereby formed together with any excess of said substance while the purified metal is being discharged from said space.

8. A method of purifying metals which comprises forcing through a molten metal as it flows progressively through a confined space a substance in vapor phase of such nature that it will combine with the elements present as impurities in the metal, extracting by vacuum the gaseous compounds thereby formed together with any excess of said substance from said space, and withdrawing the purified metal from said space during such extraction.

9. A method of purifying metals which comprises forcing through a molten metal as it flows progressively through a confined space a substance in vapor phase of such nature that it will combine with the elements present as impurities in the metal, extracting by vacuum the gaseous compounds thereby formed together with any excess of said substance from said space, withdrawing the purified metal from said space during such extraction, collecting the purified metal, and covering the purified metal with a gas inert thereto.

CLYDE E. WILLIAMS.